US012596645B2

(12) United States Patent
Malakar et al.

(10) Patent No.: US 12,596,645 B2
(45) Date of Patent: Apr. 7, 2026

(54) METHOD AND DEVICE TO UPDATE ONE OR MORE L2P MAPPING TABLES BASED ON JOURNAL REPOSITORY

(71) Applicant: Samsung Electronics Co., Ltd.,
Suwon-si (KR)

(72) Inventors: Nishchay Malakar, Bengaluru (IN);
Anantha Sharma, Bengaluru (IN);
Sharath Kumar Kodase, Bengaluru
(IN); **Gangheyamoorthy Ayyanar
Ponnusamy, Bengaluru (IN); Sushma
Vishwakarma**, Bengaluru (IN)

(73) Assignee: Samsung Electronics Co., Ltd.,
Suwon-si (KR)

( * ) Notice: Subject to any disclaimer, the term of this patent is extended or adjusted under 35 U.S.C. 154(b) by 0 days.

(21) Appl. No.: 18/746,660

(22) Filed: Jun. 18, 2024

(65) Prior Publication Data

US 2025/0342113 A1      Nov. 6, 2025

(30) Foreign Application Priority Data

May 3, 2024    (IN) .............................. 202441035138

(51) Int. Cl.
*G06F 12/02*          (2006.01)
(52) U.S. Cl.
CPC .. *G06F 12/0246* (2013.01); *G06F 2212/7201*
(2013.01)

(58) Field of Classification Search
CPC ..................... G06F 12/0246; G06F 2212/7201
See application file for complete search history.

(56) References Cited

U.S. PATENT DOCUMENTS

| | | | |
|---|---|---|---|
| 10,635,654 B2 | 4/2020 | Hof et al. | |
| 2021/0216447 A1* | 7/2021 | Fu ........................ | G06F 12/0822 |
| 2022/0300409 A1* | 9/2022 | Duan .................. | G06F 13/1668 |
| 2023/0185480 A1 | 6/2023 | Zhao | |
| 2024/0281383 A1* | 8/2024 | Tiwari .................. | G06F 3/0659 |
| 2024/0289272 A1* | 8/2024 | Tiwari ................ | G06F 12/0246 |

* cited by examiner

*Primary Examiner* — Chie Yew
(74) *Attorney, Agent, or Firm* — Wolf, Greenfield & Sacks, P.C.

(57) ABSTRACT

In the present disclosure, a method for improved metadata management includes receiving a memory write command from a host device, performing the data write operation, storing a mapping of the logical address and the physical address as a first logical-to-physical (L2P) address mapping entry of the volatile memory and as a second L2P address mapping entry of the buffer, determining whether a number of the second set of L2P address mapping entries of the buffer exceeds a predefined number of L2P address mapping entries, upon determining that the number of the second set of L2P address mapping entries of the buffer exceeds the predefined number of L2P address mapping entries, sequentially reading the plurality of L2P address mapping tables of the non-volatile memory, and updating the first set of L2P address mapping tables based on the first set of L2P address mapping entries of the volatile memory.

17 Claims, 9 Drawing Sheets

Figure 2:
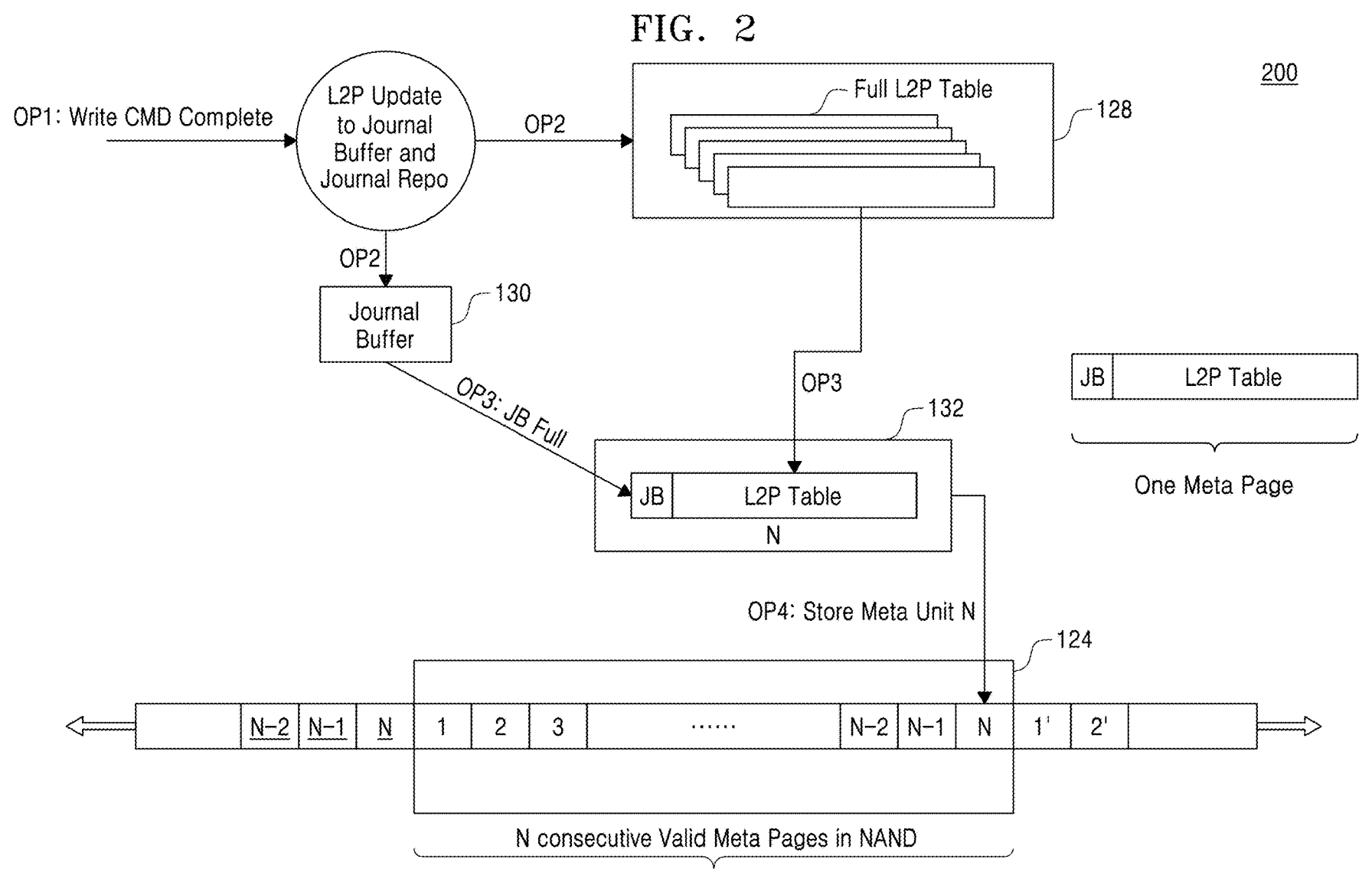

Full L2P Table

JB | L2P Table

One Meta Page

132

JB | L2P Table N

OP3

OP2

L2P Update to Journal Buffer and Journal Repo

OP1: Write CMD Complete

OP2

130

Journal Buffer

OP3: JB Full

124

OP4: Store Meta Unit N

N-2 | N-1 | N | 1 | 2 | 3 | ...... | N-2 | N-1 | N | 1' | 2'

N consecutive Valid Meta Pages in NAND

Figure 3:
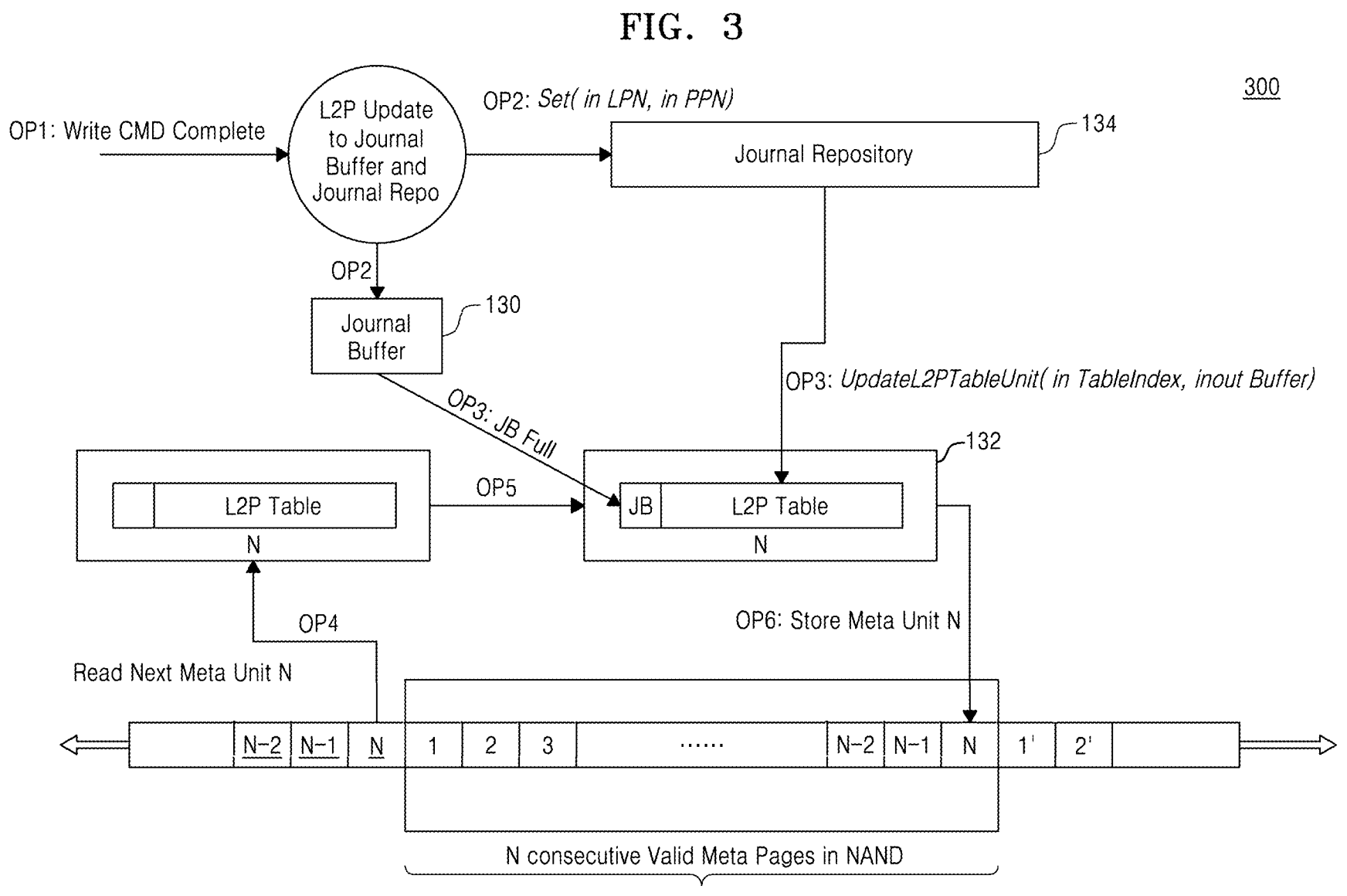

OP1: Write CMD Complete

L2P Update to Journal Buffer and Journal Repo

OP2: Set( in LPN, in PPN)

Journal Repository    134

OP2

Journal Buffer    130

OP3: JB Full

OP3: UpdateL2PTableUnit( in TableIndex, inout Buffer)

L2P Table    132

JB

L2P Table    N

OP5

OP4

Read Next Meta Unit N

L2P Table    N

OP6: Store Meta Unit N

N-2  N-1  N    1    2    3    ......    N-2  N-1  N    1'  2'

N consecutive Valid Meta Pages in NAND

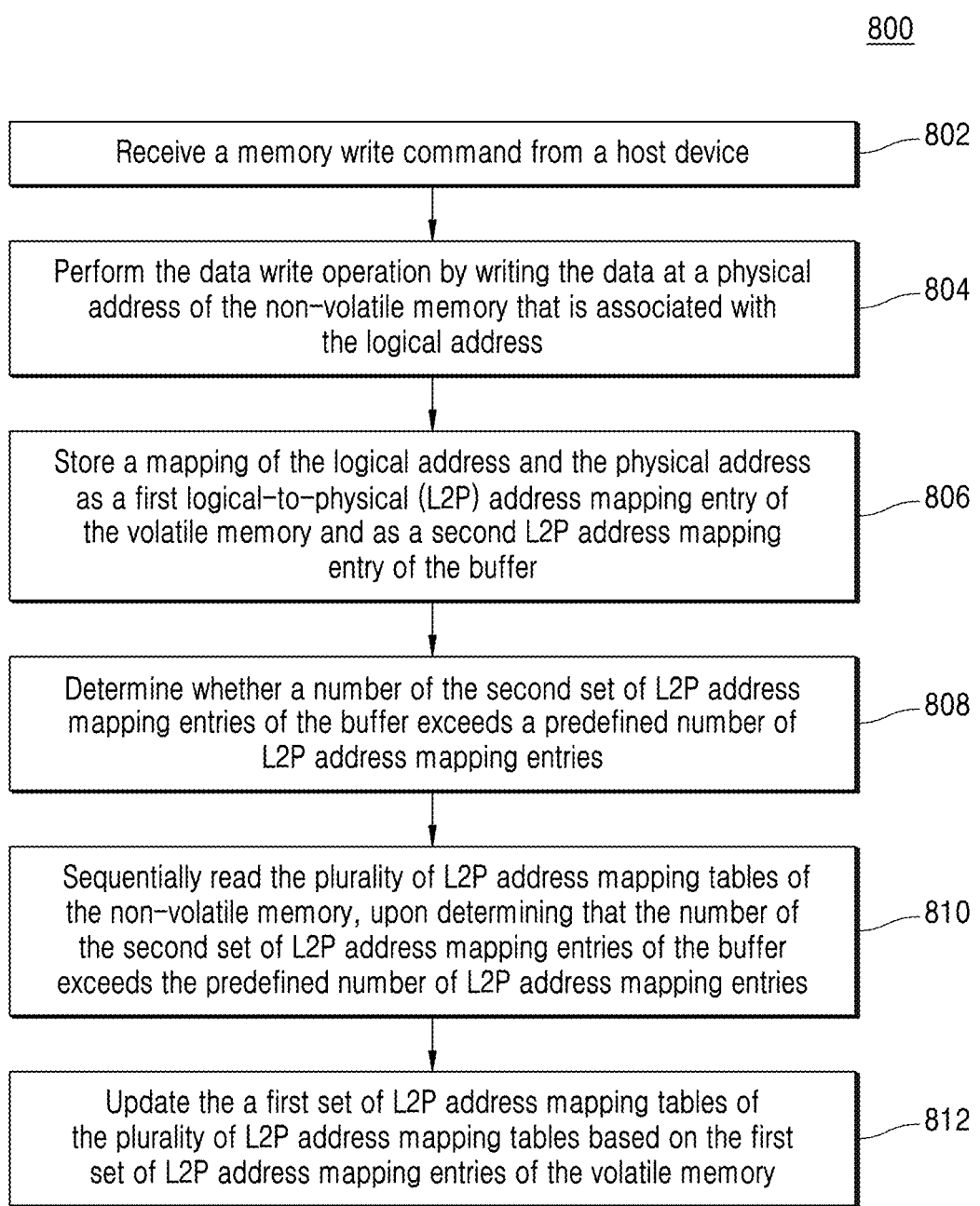

Receive a memory write command from a host device                    ⌐802

Perform the data write operation by writing the data at a physical
address of the non-volatile memory that is associated with
the logical address                                                  ⌐804

Store a mapping of the logical address and the physical address
as a first logical-to-physical (L2P) address mapping entry of
the volatile memory and as a second L2P address mapping
entry of the buffer                                                  ⌐806

Determine whether a number of the second set of L2P address
mapping entries of the buffer exceeds a predefined number of
L2P address mapping entries                                          ⌐808

Sequentially read the plurality of L2P address mapping tables of
the non-volatile memory, upon determining that the number of
the second set of L2P address mapping entries of the buffer
exceeds the predefined number of L2P address mapping entries         ⌐810

Update the a first set of L2P address mapping tables of
the plurality of L2P address mapping tables based on the first
set of L2P address mapping entries of the volatile memory            ⌐812

METHOD AND DEVICE TO UPDATE ONE OR MORE L2P MAPPING TABLES BASED ON JOURNAL REPOSITORY

CROSS-REFERENCE TO RELATED APPLICATIONS

This patent claims priority to and the benefits under 35 U.S.C. § 119(a)-(b) of Indian Patent Application No. 202441035138, filed on May 3, 2024, at the Indian Patent Office.

TECHNICAL FIELD

The present disclosure generally relates to storage devices. Particularly, the present disclosure relates to techniques for improving metadata management in storage devices.

BACKGROUND

In a storage system, a host device and a storage device typically communicate with each other to facilitate various memory operations. In a typical memory read/write operation, data is either read from or written to a memory location in the storage device. When a storage controller of the storage device receives read or write commands from the host device, the storage controller reads a Logical-to-Physical (L2P) address mapping table comprising L2P mapping information.

In high-performance storage devices such as Solid State Drives (SSDs), to improve the random write latency, the entire L2P address mapping table may be stored in a volatile memory such as a DRAM of the storage device for faster updating of L2P entries in the L2P address mapping table.

However, the poor performance of random writes in an SSD and the size of the DRAM, which is proportional to the capacity of the SSD, may inhibit the design of the SSD.

The information disclosed in this background of the disclosure section is only for enhancement of understanding of the general background of the present disclosure and should not be taken as an acknowledgment or any form of suggestion that this information forms the prior art already known to a person skilled in the art.

SUMMARY

One or more shortcomings discussed above may be overcome and additional advantages may be provided by the present disclosure.

In the present disclosure, the need for improving metadata management in a storage device is addressed. Thus, the present disclosure aims to effectively utilize the space within the volatile memory while managing updates to a Logical-to-Physical (L2P) address mapping table.

In some non-limiting embodiments of the present disclosure, the present application discloses a method for metadata management in a storage device. The method comprises receiving a memory write command from a host device, where the memory write command comprises data and a logical address associated with a data write operation initiated by the host device; performing the data write operation by writing the data at a physical address of the non-volatile memory that is associated with the logical address; storing a mapping of the logical address and the physical address as a first logical-to-physical (L2P) address mapping entry of the volatile memory and as a second L2P address mapping entry of the buffer, where the volatile memory comprises a first set of L2P address mapping entries that includes the first L2P address mapping entry, where the buffer comprises a second set of L2P address mapping entries that includes the second L2P address mapping entry, and where the first and second sets of L2P address mapping entries are associated with a plurality of L2P address mapping tables of the non-volatile memory; determining whether a number of the second set of L2P address mapping entries of the buffer exceeds a predefined number of L2P address mapping entries; upon determining that the number of the second set of L2P address mapping entries of the buffer exceeds the predefined number of L2P address mapping entries, sequentially reading the plurality of L2P address mapping tables of the non-volatile memory; and updating the a first set of L2P address mapping tables of the plurality of L2P address mapping tables based on the first set of L2P address mapping entries of the volatile memory.

In some non-limiting embodiments of the present disclosure, the method further comprises storing each of the first set of L2P address mapping tables that were updated and the second set of L2P address mapping entries of the buffer into the non-volatile memory.

In some non-limiting embodiments of the present disclosure, the method further comprises receiving a Normal Power Off (NPO) command from the host device; and upon receiving the NPO command from the host device, sequentially reading and updating corresponding L2P address mapping tables of the plurality of L2P address mapping tables based on the first set of L2P address mapping entries of the volatile memory.

In some non-limiting embodiments of the present disclosure, the sequential reading and updating of the corresponding L2P address mapping tables is performed until the buffer is empty of the second set of the L2P mapping address entries.

In some non-limiting embodiments of the present disclosure, the method further comprises receiving a Sudden Power Off Recovery (SPOR) command from the host device; and upon receiving the SPOR command from the host device, sequentially reading each of the first set of plurality of L2P address mapping tables and the second set of L2P address mapping entries of the buffer. The method further comprises updating the volatile memory based on the second set of L2P address mapping entries of the buffer.

In some non-limiting embodiments of the present disclosure, the method further comprises upon updating the first set of L2P address mapping tables, deleting the first set of L2P address mapping entries from the volatile memory.

In some non-limiting embodiments of the present disclosure, the volatile memory is part of a dynamic random access memory (DRAM) of the storage device, and the method further comprises determining a size of the volatile memory based on at least one of a size of each of the plurality of L2P address mapping tables, a total number of L2P address mapping entries in each of the plurality of L2P address mapping tables, and a size of the buffer.

In some non-limiting embodiments of the present disclosure, the present application discloses a storage device for improved metadata management. The storage device comprises a non-volatile memory, a volatile memory, and at least one storage controller. The storage controller is coupled to the non-volatile memory and the volatile memory and is configured to receive a memory write command from a host device. The memory write command comprises data and a logical address associated with a data write operation initiated by the host device. The storage controller is configured to perform the data write operation by writing the data at a physical address of the non-volatile memory that is associated with the logical address. The storage controller is configured to store a mapping of the logical address and the physical address as a first logical-to-physical (L2P) address mapping entry of the volatile memory and as a second L2P address mapping entry of the buffer, wherein the volatile memory comprises a first set of L2P address mapping entries that includes the first L2P address mapping entry, wherein the buffer comprises a second set of L2P address mapping entries that includes the second L2P address mapping entry, and wherein the first and second sets of L2P address mapping entries are associated a plurality of L2P address mapping tables of the non-volatile memory. The storage controller is further configured to determine whether a number of the second set of L2P address mapping entries of the buffer exceeds a predefined number of L2P address mapping entries. The storage controller is configured to, upon determining that the number of the second set of L2P address mapping entries of the buffer exceeds the predefined number of L2P address mapping entries, sequentially read the plurality of L2P address mapping tables of the non-volatile memory; and update a first set of L2P address mapping tables of the plurality of L2P mapping tables based on the first set of L2P address mapping entries of the volatile memory.

In some non-limiting embodiments of the present disclosure, the storage controller is further configured to store each of the first set of L2P address mapping tables that were updated and the second set of L2P address mapping entries of the buffer into the non-volatile memory.

In some non-limiting embodiments of the present disclosure, the storage controller is further configured to receive a Normal Power Off (NPO) command from the host device. Upon receiving the NPO command from the host device, the storage controller is configured to sequentially read and update corresponding L2P address mapping tables of the plurality of L2P address mapping tables based on the first set of L2P address mapping entries of the volatile memory.

In some non-limiting embodiments of the present disclosure, the sequential reading and updating of the corresponding L2P address mapping tables is performed until the buffer is empty of the second set of the L2P mapping address entries.

In some non-limiting embodiments of the present disclosure, the storage controller is further configured to receive a Sudden Power Off Recovery (SPOR) command from the host device. Upon receiving the SPOR command from the host device, the storage controller is further configured to sequentially read each of the stored plurality of L2P address mapping tables and the second set of L2P address mapping entries of the buffer; and update the volatile memory based on the second set of L2P address mapping entries of the buffer.

In some non-limiting embodiments of the present disclosure, the storage controller is further configured to, upon updating the first set of L2P address mapping tables, delete the first set of L2P address mapping entries from the volatile memory.

In some non-limiting embodiments of the present disclosure, the volatile memory is a part of dynamic random access memory (DRAM) of the storage device, and the storage controller is further configured to determine a size of the volatile memory based on at least one of a size of each of the plurality of L2P address mapping tables, a total number of L2P address mapping entries in each of the plurality of L2P address mapping tables, and a size of the buffer.

In some non-limiting embodiments of the present disclosure, the storage controller is further configured to receive a memory read command from the host device, where the memory read command comprises data and a logical address associated with a data read operation initiated by the host device; determine whether a logical-to-physical (L2P) address mapping entry of a plurality of L2P address mapping entries that corresponds to the logical address associated with the data read operation is stored in the volatile memory, where the L2P address mapping entry comprises a physical address that is mapped to the logical address; in response to determining that the L2P address mapping entry corresponding to the logical address associated with the data read operation is stored in the volatile memory, perform the data read operation by reading the data from the physical address of the non-volatile memory; and in response to determining that the L2P address mapping entry corresponding to the logical address associated with the data read operation is not stored in the volatile memory: read a first L2P address mapping table of the plurality of L2P address mapping tables, where the first L2P address mapping table comprises the L2P address mapping entry corresponding to the logical address associated with the data read operation; and perform the data read operation by reading the data from the physical address of the non-volatile memory.

In some non-limiting embodiments of the present disclosure, the at least one storage controller is configured to terminate the write operation upon determining that the number of the second set of L2P address mapping entries of the buffer does not exceed the predefined number of L2P address mapping entries.

The present disclosure provides a method for metadata management in a storage device comprising a volatile memory, a non-volatile memory, and a buffer. The method includes receiving a memory read command from a host device, wherein the memory read command comprises data and a logical address associated with a data read operation initiated by the host device; determining whether a logical-to-physical (L2P) address mapping entry of a plurality of L2P address mapping entries that corresponds to the logical address is stored, wherein the L2P address mapping entry comprises a physical address that is mapped to the logical address; and in response to determining that the L2P address mapping entry corresponding to the logical address is not stored: reading a first L2P address mapping table of the plurality of L2P address mapping tables, wherein the first L2P address mapping table comprises the L2P address mapping entry corresponding to the logical address; and performing the data read operation by reading the data from the physical address of the non-volatile memory.

BRIEF DESCRIPTION OF THE DRAWINGS

At least some aspects, a storage mechanism may have a modification in metadata management of a storage device by effectively utilizing the space within the volatile memory while managing updates to an L2P address mapping table.

Further aspects and advantages of the present disclosure will be readily understood from the following detailed description with reference to the accompanying drawings. Reference numerals have been used to refer to identical or functionally similar elements. The figures together with a detailed description below are incorporated in and form part of the specification and serve to further illustrate the embodiments and explain various principles and advantages, in accordance with the present disclosure wherein:

FIG. 2 illustrates a detailed process flow diagram depicting a conventional procedure 200 for storing L2P updates in a non-volatile memory of a storage device.

FIG. 3 illustrates detailed process flow diagram depicting a procedure 300 for storing L2P updates in a non-volatile memory of a storage device 120 in accordance with embodiments of the present disclosure.

FIG. 8 illustrates a flow chart of a method 800 performed by a storage device for improved metadata management in accordance with embodiments of the present disclosure.

Figure 1:
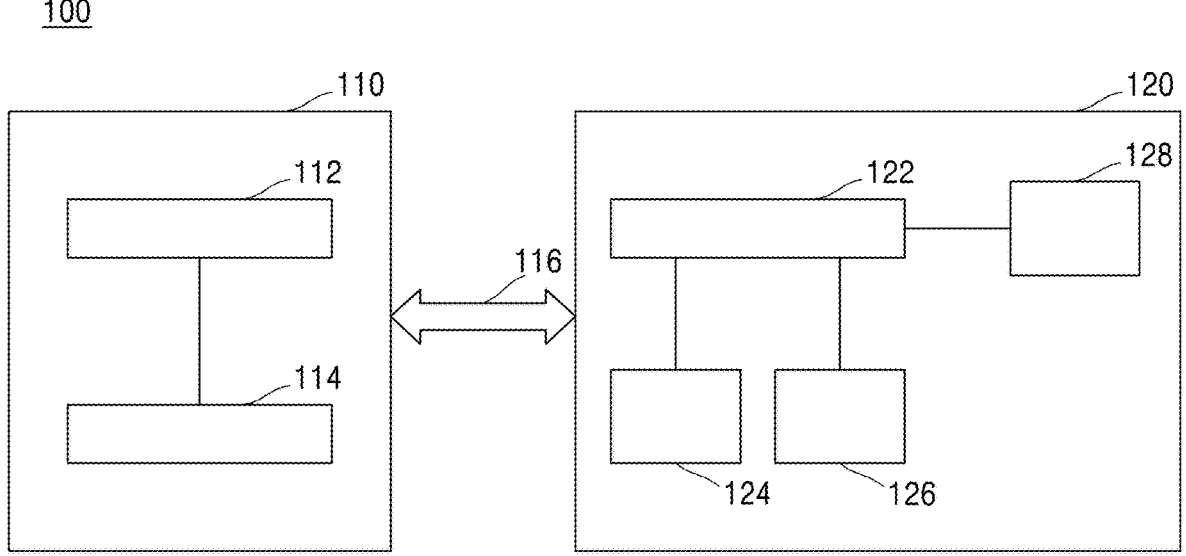
FIG. 1 illustrates a high-level block diagram of an example storage system 100 comprising a host device 110 configured to communicate with a storage device 120 according to embodiments of the present disclosure.

It should be appreciated by those skilled in the art that any block diagrams herein represent conceptual views of the illustrative systems embodying the principles of the present disclosure. Similarly, it will be appreciated that any flowcharts, flow diagrams, state transition diagrams, pseudo code, and the like represent various processes which may be substantially represented in computer-readable medium and executed by a computer or processor, regardless of whether such computer or processor is explicitly shown.

DETAILED DESCRIPTION

While the disclosure is susceptible to various modifications and alternative forms, specific embodiments thereof have been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms like "SSD" and "SSD device" and "storage device" have been used interchangeably throughout the disclosure. Further, the terms like "host" and "host device" and "host computer" have been used interchangeably throughout the disclosure. The terms like "host controller"

and "processor" and "processing unit" and "central processing unit" have been used interchangeably throughout the disclosure.

A typical storage system may comprise a storage device communicatively coupled with a host device. A processing unit or central processing unit (CPU) of the host device is responsible for managing various memory operations. The storage device may comprise a non-volatile memory (NVM). The storage device apart from the NVM, also includes a storage controller and a volatile memory. The volatile memory of the storage device that can, for example, include a Dynamic Random Access Memory (DRAM) or a Static Random Access Memory (SRAM). In some embodiments, the data stored in the volatile memory can include data read from the NVM or data to be written to the NVM. In this regard, the volatile memory can include a write buffer or a read buffer for temporarily storing data.

While performing memory operations, the storage controller receives data from the host device and stores it at one or more memory locations of the NVM. The NVM is configured to store either system data or user data. In some embodiments, a logical block addressing (LBA) scheme may be used for specifying the location of blocks of data stored in the NVM. LBA provides a linear address space to the host device, irrespective of the actual physical address locations in the NVM. The use of logical-to-physical block address conversion allows the storage controller to effectively manage the memory space within the NVM. The storage controller uses a logical-block-address to physical-block-address (L2P) mapping table to record mapping relationships between logical addresses (managed by the host device) and physical addresses (managed by the storage controller). The L2P address mapping table may be a table or other data structure that includes a logical block address (LBA) associated with each memory location in the NVM where data is stored. The L2P address mapping table may be stored in the volatile memory and may be backed up in the NVM at predetermined intervals or events.

When the storage controller of the storage device receives read or write commands from the host device, the storage controller reads the L2P address mapping table for L2P mapping information. The L2P address mapping table may include multiple L2P pages/tables, each page/table including multiple L2P entries, where each L2P entry stores L2P mapping information for a range of logical addresses. For instance, each L2P entry may include L2P mapping information for eight logical addresses (e.g., 4 KB of logical address space), and each L2P page may include 1024 L2P entries (i.e., addressing 4 MB of logical address space). Particularly in high-performance storage devices such as SSDs, to improve the random write latency, entire L2P address mapping table are stored in the volatile memory for efficient management of L2P address mapping table.

Typically, the size of the DRAM of the storage device is directly proportional to the size of the SSD device. For a storage device capable of storing 100 GB of data, 100 MB of space may be occupied for storing L2P mapping information. A 4K Logical Page Size is a common design in many off-the-shelf SSDs. 4K Logical Page Size implies that each L2P entry addresses 4K of user data. For a 4K Logical Page size, DRAM requirement for a storage device with respect to the total capacity of non-volatile memory may be of the ratio 1000:1. In lower DRAM products, generally 8K or 16K Logical Page Size may be used to compensate for the reduced DRAM size. However, 8K or 16K Page sizes may inhibit the write amplification factor (WAF). WAF is a parameter for tracking the lifetime and endurance of a storage device. Thus, 8K/16K Page sizes may inhibit the lifetime and endurance of the storage device.

Further, in DRAM Less devices or Low DRAM devices, instead of storing the entire L2P table in the DRAM, demand loading methods may be utilized to dynamically store the L2P mapping information based on the storage needs. These demand loading techniques may further exacerbate the above-described issues and may inhibit the random write performance.

Furthermore, frequent meta updates on the non-volatile memory may result in a meta garbage collection (GC) process. Triggering of a meta GC process may cause time-outs during run-time, thereby inhibiting the performance of the DRAM-less SSD devices.

Thus, there may be one or more concerns affecting the design of SSDs. For example, one concern may be the poor performance of random writes in an SSD and a second may be the size of the DRAM, which is proportional to the capacity of the SSD. Thus, to address the above-mentioned limitations and to provide an efficient storage mechanism, there exists a need to improve the metadata management of a storage device by effectively utilizing the space within the volatile memory while managing updates to an L2P address mapping table.

Furthermore, when an abnormal power-down occurs, the latest mapping relationship may not be stored. In such cases, conventional techniques may include performing a full-disk scanning on the non-volatile memory to sequentially read each L2P page/table in order to determine the correct and updated relationship between the physical and the logical addresses. Hence, in the conventional techniques, the entire L2P address mapping table is reconstructed in the volatile memory. This becomes more problematic when there is large volume of data. Thus, the present disclosure provides an efficient mechanism for management of updates to the L2P address mapping table.

To solve some or all of the above-identified problems, the present disclosure discloses techniques for optimizing the updates to the L2P address mapping table stored in the non-volatile memory. The present disclosure aims to reduce the DRAM requirement for SSDs while still maintaining a 4K Logical Page size needed for random write performance. The present disclosure aims to effectively utilize the space within the volatile memory while managing updates to an L2P address mapping table.

FIG. 1 illustrates a high-level block diagram of an example storage system 100 comprising a host device 110 configured to communicate with a storage device 120. The host device 110 may comprise at least one processing unit 112 and a host memory 114. The host memory 114 may also be referred to as a main memory that temporarily stores data and information to be transmitted to and received from the storage device 120. Further, the storage device 120 may comprise at least one processor or storage controller 122, an NVM 124, a volatile memory 126, and a temporary buffer 128. The storage controller is configured to provide access to various memory locations of the NVM 124 of the storage device 120. In one non-limiting embodiment, data between the host device 110 and the storage device 120 is transferred through one or more data buses and/or address buses 116.

In one non-limiting embodiment, the host device 110 of FIG. 1 may be any mobile or non-mobile device, such as, but not limited to, a portable communication terminal (e.g., a mobile phone), a smartphone, a tablet personal computer, a wearable device, a healthcare device, an Internet of things (IoT) device, a Personal Computer (PC), a laptop computer, a server, a media player, or an automotive device (e.g., a navigation device). Further, the host device 110 may comprise one or more image capturing devices, one or more input devices, one or more output devices, one or more sensors, at least one display devices, at least one power source, and at least one connecting interface, but the host device 110 is not limited thereto. The host memory 114 may be a volatile memory, such as static random-access memory (SRAM) and/or dynamic RAM (DRAM). In one non-limiting embodiment of the present disclosure, the host memory 114 may also include various cache memories utilized by the host processing unit 112 in various processes.

In one non-limiting embodiment, the processing unit 112 and the host memory 114 may be implemented as separate semiconductor chips. Alternatively, in some embodiments, the processing unit 112 and the host memory 114 may be integrated in the same semiconductor chip. As an example, the processing unit 112 may be any one of a plurality of modules included in an application processor (AP). The AP may be implemented as a System on Chip (SoC). Further, the host memory 114 may be an embedded memory included in the AP or a memory module located outside the AP.

The host device 110 may be driven by an operating system. The operating system may include a device driver for controlling the host device 110 at an operating system level. The device driver may be a software module, e.g., a Kernel module, for controlling the host device 110. The host device 110 may request a write operation and/or a read operation on the storage device 120 through the device driver. The host device 110 may perform a read operation on a specific address in the storage device 120 by transmitting a memory request to the host device 110 to initiate a memory operation.

In one embodiment, the storage device 120 may be a Solid-State Drive (SSD) device, where the NVM 124 is a flash-based memory, i.e., a NAND memory. The storage controller 122 may comprise a command scheduler that manages execution of commands received from the host device 110. The command scheduler may ensure that the commands are executed efficiently and in a sequential manner.

In one non-limiting embodiment, the volatile memory 126 of the storage device 120 may be an SRAM or DRAM configured to store data in response to requests from the host device 110. The storage device 120 may transmit data stored at a specific address to the host device 110 after receiving a read request from the host device 110. While FIG. 1 illustrates the volatile memory as being remote from a storage controller 122 of the storage device, in some embodiments, the volatile memory may be integrated into the storage controller 122.

In one non-limiting embodiment, the storage controller 122 may either be part of the storage device 120 or may be physically separated from or implemented in an external device other than the storage device 120. Each configuration described herein may be made up of separate chips, modules, or devices, or may be included inside a single chip/module/device.

FIG. 2 illustrates a detailed process flow diagram depicting a conventional procedure 200 for storing L2P updates in an NVM 124 of a storage device 120.

Traditionally, when a memory request for performing a memory operation is received from one or more applications running on the host device 110, the storage controller 122 reads the L2P address mapping table for identifying physical memory locations that are to be accessed for performing the memory operation. A typical memory request may comprise at least one logical address and other related information associated with the memory request.

In a typical storage device, a journal buffer 130 may be present in a DRAM. The journal buffer 130 is a temporary storage that is used for storing L2P updates. Apart from the journal buffer 130, the storage device may also comprise one or more temporary buffers 128 for storing the L2P address mapping table and one or more meta unit buffers 132 for temporarily storing a specific L2P page/table.

In a typical memory write operation, the host device 110 transmits a request via the host interface to write data to a given logical block address (LBA) associated with the NVM 124. Once the data is written to the corresponding memory location and the memory write operation is completed, a procedure 200 for storing L2P updates in an NVM 124 of a storage device 120 is initiated. The procedure 200 comprises a series of operations. For instance, at operation OP1, the host device 110 transmits an indication regarding the completion of the write operation to the storage controller 122. At operation OP2, the storage controller 122 writes an L2P update to the journal buffer 130 and a temporary buffer 128 based on the indication. The temporary buffer 128 stores the entire L2P address mapping table. The journal buffer 130 may have a limited size and may only store the most recent L2P updates/pages. The L2P address mapping table may comprise a plurality of L2P pages/tables. At OP2, in response to the indication, the storage controller 122 writes the L2P update into the corresponding L2P page/table of the L2P address mapping table. In an embodiment, the journal buffer 130 and the temporary buffer 128 may be part of a temporary memory space within the storage controller 120. In another embodiment, the journal buffer 130 and the temporary buffer 128 may be part of the volatile memory 126 or DRAM of the storage device 120. At operation OP3, the storage controller 122 determines the condition of whether the journal buffer 130 is full. Based on the condition, the storage controller 122 empties the journal buffer 130 and all its entries are stored in a temporary meta unit buffer 132. Further, at OP3, based on the L2P updates, a corresponding L2P table N from the temporary buffer 128 is also stored in the meta unit buffer 132 along with the journal buffer entries. Further, at operation OP4, the contents of the meta unit buffer 132 are written to the NVM or NAND memory 124. The NVM/NAND memory 124 stores the entire L2P address mapping table. As mentioned above, an L2P address mapping table comprises a plurality of L2P pages/tables, and each L2P table corresponds to a meta unit of the metadata stored in the NVM 124. In one embodiment, there may be a total of N meta units in the NVM 124. Particularly, at OP4, the contents of the meta unit buffer 132 are written to the corresponding meta unit within the NVM 124. The meta units within the NVM 124 may be stored in a circular sequence.

In the conventional approach, two copies of L2P address mapping tables are stored in the storage device 120, i.e., in the temporary buffer 128 of the DRAM 126 and the NVM 124. To efficiently utilize the space within the DRAM 126, the techniques of present disclosure propose a journal repository buffer 134 having much reduced storage than the temporary buffer 128. The present disclosure utilizes the journal repository buffer 134 for enhancing metadata management in the storage device 120.

FIG. 3 illustrates a detailed process flow diagram depicting the procedure 300 for storing L2P updates in an NVM 124 of a storage device 120 in accordance with an embodiment of the present disclosure.

As illustrated in FIG. 3, in response to receiving a memory write request by a storage device 120, the storage controller 122 writes data a memory location in NVM 124, and the procedure 300 for storing L2P updates in the NVM 124 of the storage device 120 is subsequently initiated. The procedure 300 comprises a series of operations. At operation OP1, the host device 110 transmits an indication regarding the completion of the write operation to the storage controller 122. At operation OP2, the storage controller 122 writes an L2P update to the journal buffer 130 and the journal repository buffer 134 based on the indication. In an embodiment of the present disclosure, the journal repository buffer 134 may be part of a temporary memory space within the storage controller 120 or may be an external storage module. In another embodiment, the journal repository buffer 134 may be part of the volatile memory 126 or DRAM of the storage device 120. In one embodiment, the journal repository buffer 134 may be a hardware or a software managed buffer, which is an additional buffer that is separate from the journal buffer 130. Predefined API commands may be used to initialize and update the journal repository buffer 134. The one or more predefined API commands for configuring the journal repository buffer 134 may be:

Init(NumL2PTables, NumEntriesInOneL2PTableUnit, BitsPerL2PEntry) for initialization of the L2P address mapping table of the journal repository buffer 134;

Set(In LPN, In PPN) for storing L2P Update in the L2P address mapping table of the journal repository buffer 134;

Get(In LPN, out PPN) for retrieving L2P page/table from the L2P address mapping table of the journal repository buffer 134; and UpdateL2PTableUnit (In TableIndex, Inout Buffer) retrieving a corresponding L2P Page/table from the L2P address mapping table based on a TableIndex value and storing the same in the meta unit buffer 132.

In OP2, the journal repository buffer 134 is updated by storing the L2P update using the Set API method. At operation OP3, the storage controller 122 determines the condition of whether the journal buffer 130 is full. Based on the condition, the storage controller 122 empties the journal buffer 130 and all its entries are stored in a temporary meta unit buffer 132. Further, at OP3 and based on the L2P updates, a corresponding L2P table N from the journal repository buffer 134 is also stored in the meta unit buffer 132 along with the journal buffer entries. In OP3, the meta unit buffer 132 is updated based on contents of the journal repository buffer 134 using the UpdateL2PTableUnit API method. Further, at OP4, the storage controller 122 reads and retrieves a corresponding L2P table N from the NVM 124, which corresponds to the L2P Table N of the meta unit buffer 132. At OP5, the storage controller 122 updates the contents of the meta unit buffer 132 based on the retrieved L2P table N.

Further, at operation OP6, the contents of the meta unit buffer 132 are written to the corresponding meta unit N within the NVM 124.

Figure 4:
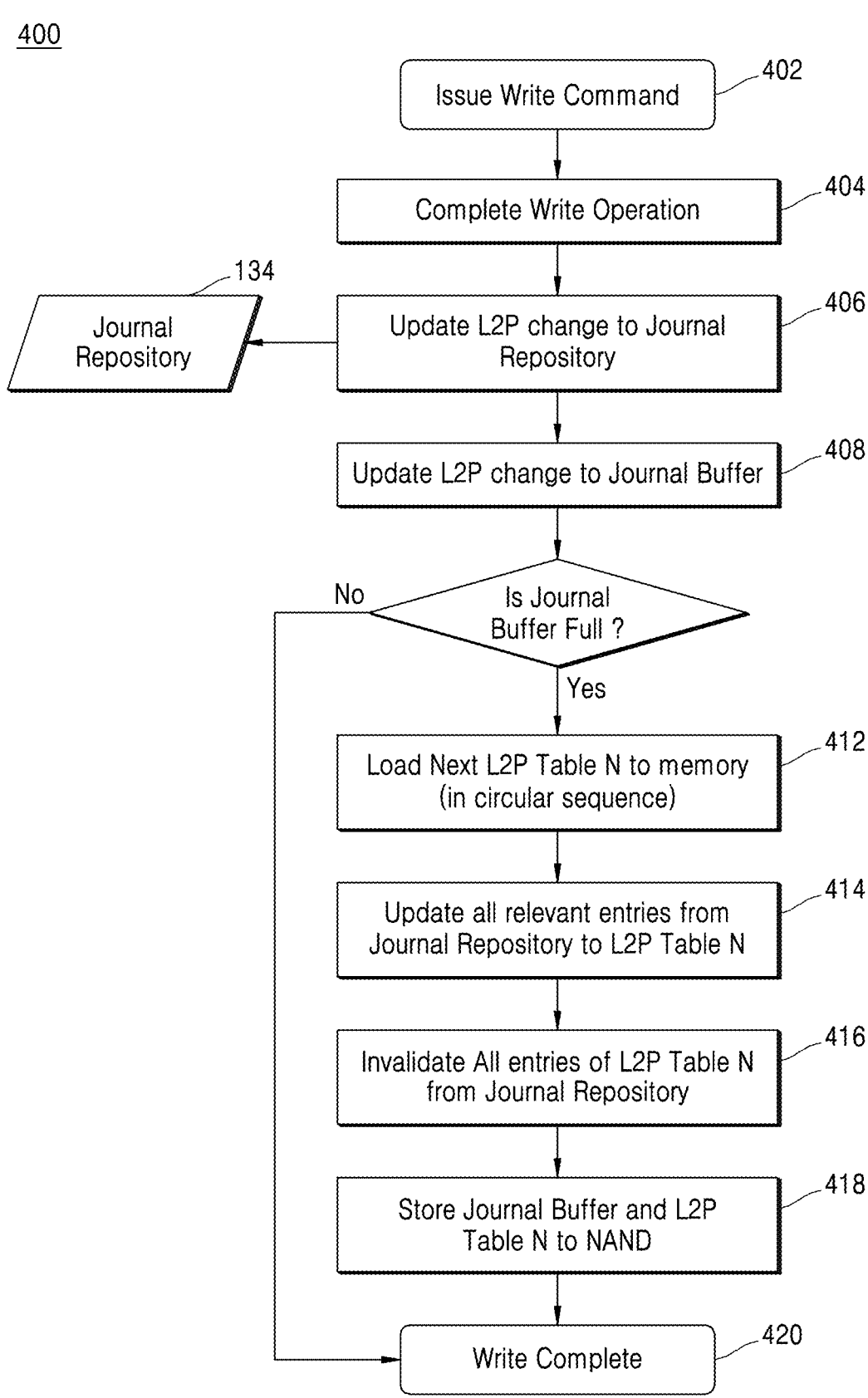
FIG. 4 illustrates a process flow diagram depicting a procedure 400 for storing L2P updates in a non-volatile memory of a storage device 120 during a memory write operation in accordance with embodiments of the present disclosure.

FIG. 4 illustrates a process flow diagram depicting the procedure 400 for mapping an L2P update in an NVM 124 of a storage device 120 during a memory write operation in accordance with an embodiment of the present disclosure.

The procedure 400 at block 402 comprises issuing of a write command or request by the host device 110. The procedure 400 at block 404 comprises performing and completing the write operation based on the write command. The procedure 400 at blocks 406 and 408 comprise adding and updating the L2P updates in the journal repository buffer 134 and the journal buffer 130 for every write operation, respectively. The procedure 400 at block 410 comprises determining, by the storage controller 122, a journal buffer full condition (e.g., determining whether the journal buffer 130 is full or has a number of entries that exceeds a predetermined threshold number of entries). In case the journal buffer 130 is determined as FULL, at block 412, a next L2P table N is read and loaded into a meta unit buffer 132 in a circular sequence. In case the journal buffer 130 is determined as not FULL, at block 420, the write operation is terminated. The procedure 400 at block 414 comprises updating all relevant L2P entries from the journal repository buffer 134 to the recently loaded L2P table N of the meta unit buffer 132. At block 416, all L2P entries corresponding to the L2P Table N are invalidated or deleted/flushed out of the journal repository buffer 134. At block 418, the meta unit buffer 132 is written to the corresponding meta unit N in the NVM 124 and the write operation is terminated at block 420.

Figure 5:
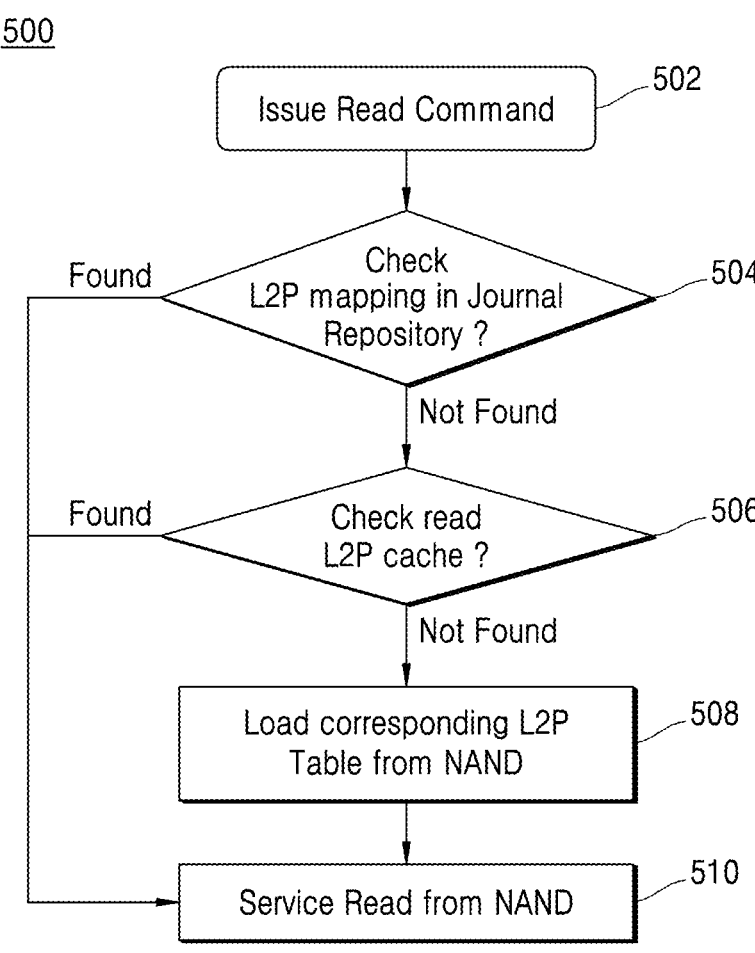
FIG. 5 illustrates a process flow diagram depicting a procedure 500 for storing L2P updates in a non-volatile memory of a storage device 120 during a memory read operation in accordance with embodiments of the present disclosure.

FIG. 5 illustrates a process flow diagram depicting the procedure 500 for storing L2P updates in an NVM 124 of a storage device 120 during a memory read operation in accordance with an embodiment of the present disclosure.

The procedure 500 at block 502 comprises issuing of a read command or request by the host device 110. The procedure 500 at block 504 comprises checking whether an L2P entry corresponding to the read request is present in the journal repository buffer 134. In case the L2P entry is present in the journal repository buffer 134, at block 510, the data corresponding to the read request is read from the NVM 124 based on the L2P entry. In the case that the L2P entry is not present in the journal repository buffer 134, at block 506, an L2P cache is checked for the L2P entry. In case the L2P entry is not present or stored in the L2P cache, at block 508, an L2P page/table corresponding to the L2P entry is read and retrieved from the NVM 124, and based on the retrieved L2P table, the corresponding data is read from the NVM 124 at block 510. In case the L2P entry is already present or stored in the L2P cache, at block 506, the block 510 is executed.

That is, in a read operation, the Journal repository buffer 134 is checked for availability of the relevant L2P entry, and in response to an unavailability of the L2P entry in the journal repository buffer 134, the corresponding L2P table from NVM 124 is loaded into the journal repository buffer 134 on demand.

Figure 6:
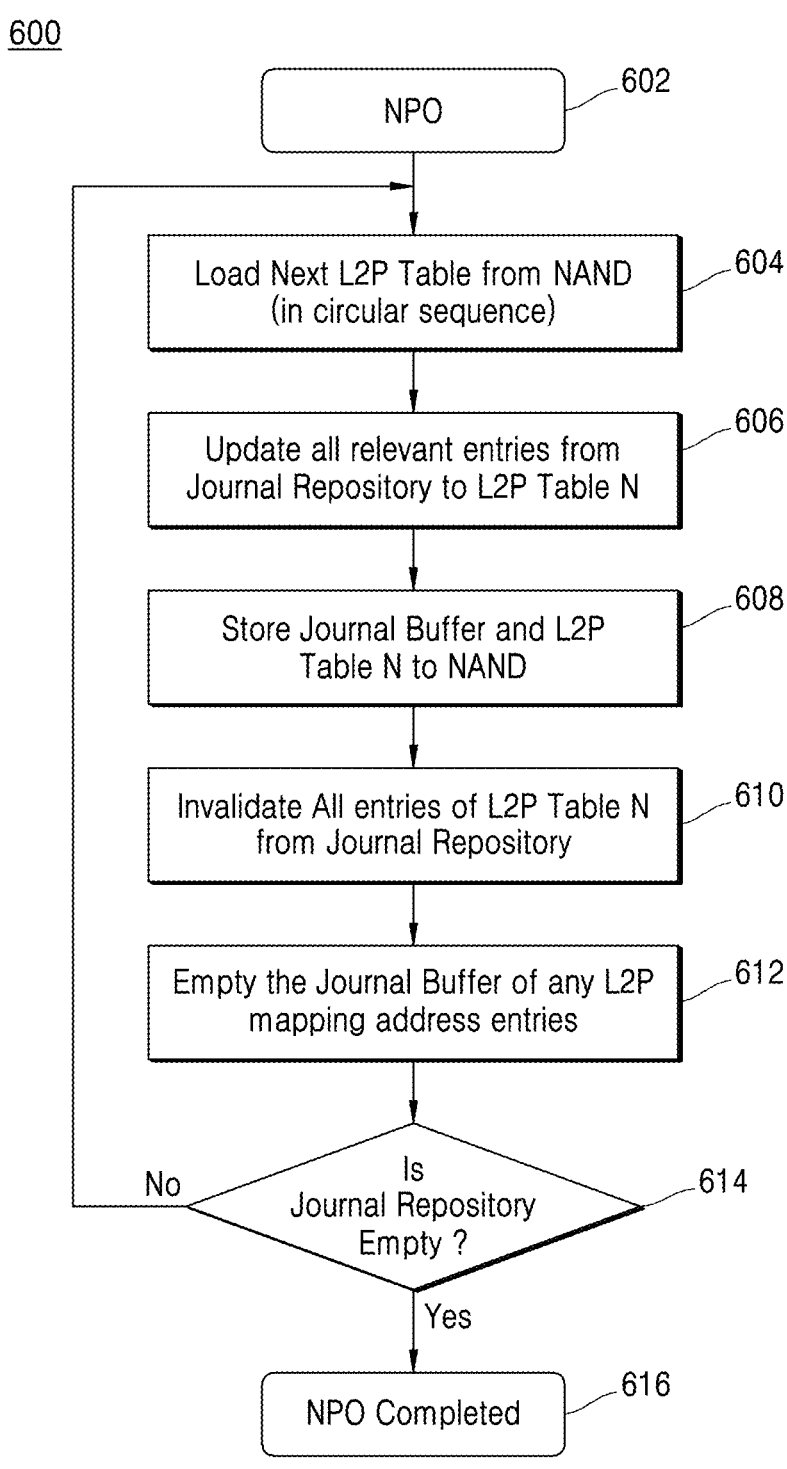
FIG. 6 illustrates a process flow diagram depicting a procedure 600 for storing L2P updates in non-volatile memory of a storage device 120 during a Normal Power Off (NPO) operation in accordance with embodiments of the present disclosure.

FIG. 6 illustrates a process flow diagram depicting the procedure 600 for storing L2P updates in an NVM 124 of a storage device 120 during a memory Normal Power Off (NPO) operation in accordance with an embodiment of the present disclosure.

The procedure 600 at block 602 comprises receiving a NPO command from the host device 110; and at blocks 604, 606, 608, and 610, upon receiving the NPO command from the host device 110, sequentially reading and updating corresponding L2P pages/tables of the L2P address mapping table in the NVM 124 based on the contents of the journal buffer 134. This sequential process continues until the journal repository buffer 134 is empty of the respective set of L2P address mapping entries (block 614). Further, at block 612, the storage controller empties the journal buffer 130 for each iteration of this sequential process. During the NPO condition, consecutive meta units are fetched from the NVM 124 every cycle and the corresponding entries are flushed from the journal repository buffer 134 and journal buffer. At block 616, the NPO recovery operation is terminated.

Figure 7:
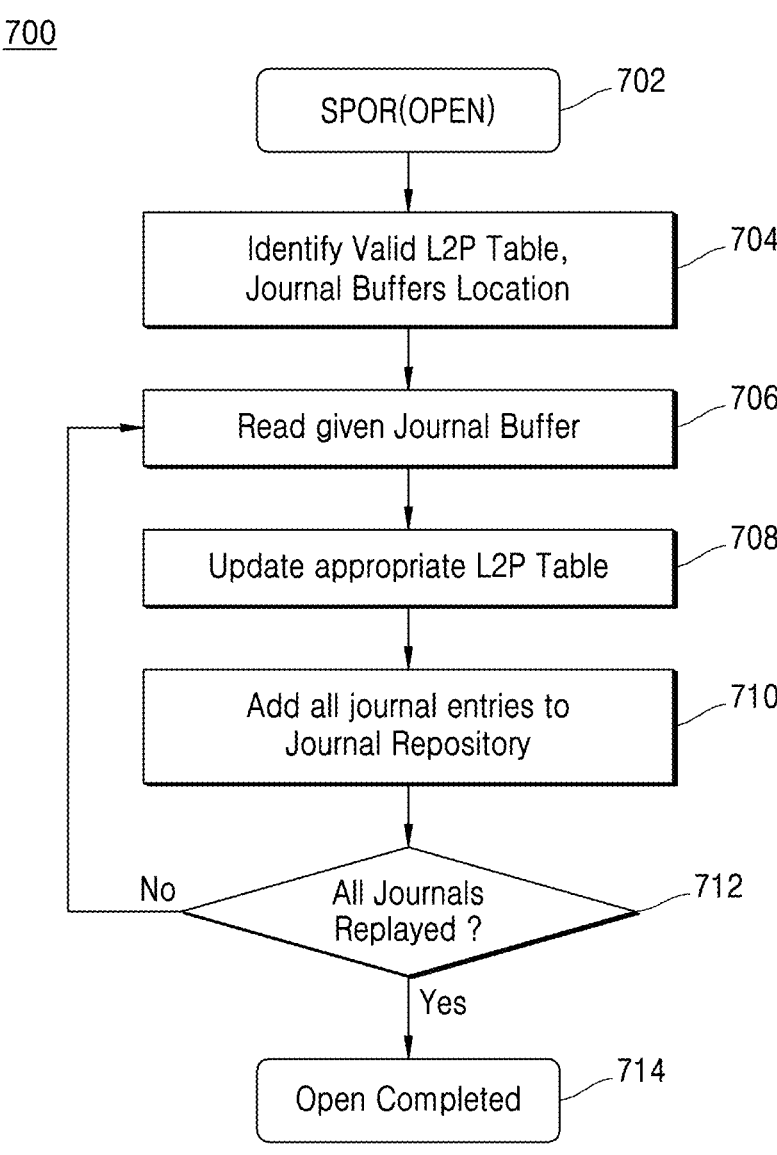
FIG. 7 illustrates a process flow diagram depicting a procedure 700 for storing L2P updates in non-volatile memory of a storage device 120 during a Sudden Power Off Recovery (SPOR) operation in accordance with embodiments of the present disclosure.

FIG. 7 illustrates a process flow diagram depicting the procedure for storing L2P updates in an NVM 124 of a storage device 120 during a memory Sudden Power Off Recovery (SPOR) operation in accordance with an embodiment of the present disclosure.

The procedure 700 at block 702 comprises receiving a SPOR command from the host device 110; and at blocks 704-706, upon receiving the SPOR command from the host device 110, sequentially reading each of the stored plurality of L2P entries of the journal buffer 130. The procedure 700 further comprises, at blocks 708, 710, and 712, updating the journal repository buffer 134 based on L2P entries of the journal buffer 130. During SPOR, the journal repository buffer 134 is restored from the contents of the journal buffer 130. At block 714, the SPOR recovery operation is terminated.

FIG. 8 illustrates a flow chart of a method 800 performed by a storage device 120 for improved metadata management in accordance with an example embodiment of the present disclosure. The various operations of method 800 may be performed by the storage device 120 (particularly, using the storage controller 122 of the storage device 120).

The method at block 802 comprises receiving a memory write command from a host device 110. The memory write command comprises data and a logical address associated with a data write operation initiated by the host device 110.

The method at block 804 comprises performing the data write operation by writing the data at a physical address of the NVM 124 that is associated with the logical address.

The method at block 806 comprises storing a mapping of the logical address and the physical address as an L2P address mapping entry of the volatile memory 126 and as a second L2P address mapping entry of the buffer 134. Hereinafter, the journal repository buffer 134 is referred to as the buffer 134. The volatile memory 126 comprises a first set of L2P address mapping entries that includes the first L2P address mapping entry and the buffer 134 each comprise a second set of L2P address mapping entries that includes the second L2P address mapping entry, and wherein the first and second sets of L2P address mapping entries are associated with a plurality of L2P address mapping tables of the non-volatile memory 126.

The method at block 808 comprises determining whether a number of the second set of L2P address mapping entries of the buffer 134 exceeds a predefined number of L2P address mapping entries.

The method at block 810 comprises sequentially reading the plurality of L2P address mapping tables of the NVM 124 upon determining that the number of the second set of L2P address mapping entries of the buffer 134 exceeds the predefined number of L2P address mapping entries.

The method at block 812 comprises updating a first set of L2P address mapping tables of the plurality of L2P address mapping tables based on the first set of L2P address mapping entries of the volatile memory.

In some non-limiting embodiments of the present disclosure, the method further comprises storing each of the updated first set of L2P address mapping tables that were updated and the second set of L2P address mapping entries of the buffer 134 into the NVM 124.

In some non-limiting embodiments of the present disclosure, the method 800 further comprises, upon updating the one or more L2P address mapping tables, deleting the one or more L2P address mapping entries from the volatile memory.

In some embodiments, the storage device 120 refrains from storing a full L2P address mapping tables in the buffer 134.

In some embodiments, the journal repository buffer 134 may be configured by estimating a size of the buffer 134. In some embodiments, for every M (where M is any integer number) L2P entries corresponding to a meta unit N, one journal repository entry is present in the DRAM 126. If the plurality of L2P entries corresponding to the entire L2P address mapping table is N1, then the total journal repository entries J that may be present in the DRAM 126 may be calculated as J=N1/M. As such, the size of the journal repository 130 may be greater than J. The minimum DRAM requirement for a write operation may be J, and the minimum DRAM requirement for a read operation may be the size of one meta unit.

In some non-limiting embodiments of the present disclosure, the volatile memory is a part of the DRAM 126 of the storage device 120, and the method further comprises determining a size of the volatile memory based on at least one of the plurality of L2P address mapping tables, a size of each L2P address mapping table, a total number of L2P address mapping entries in each L2P address mapping table, and a size of the buffer.

Figure 9:
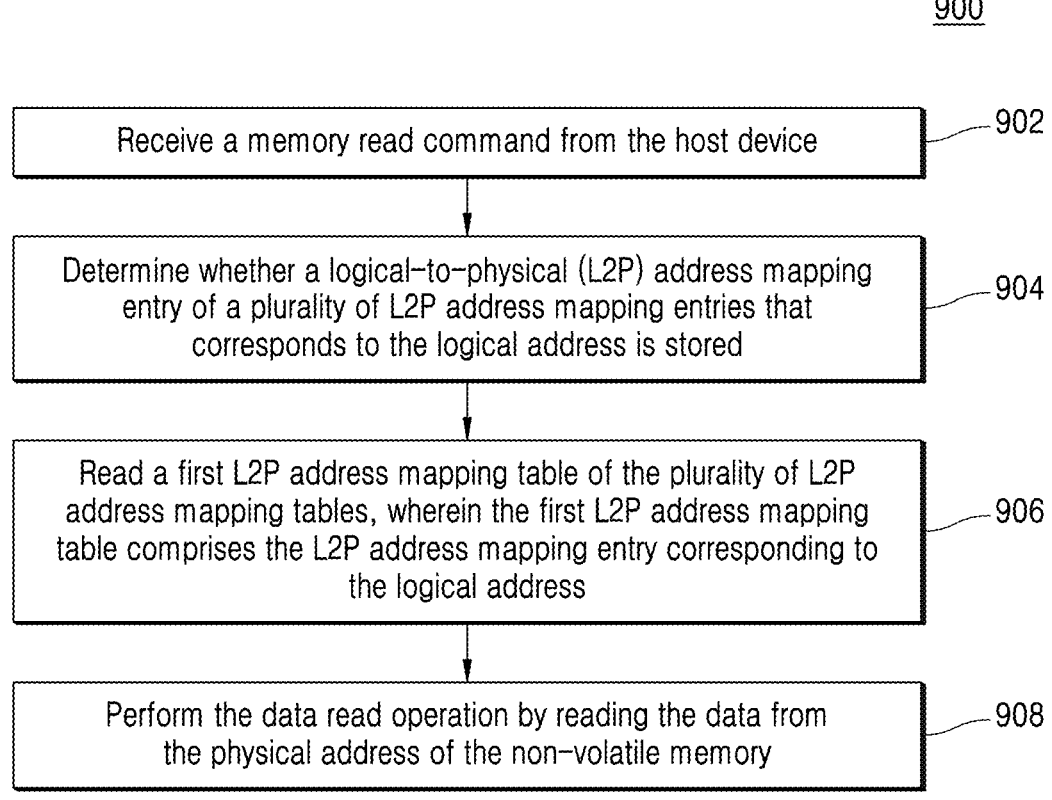
FIG. 9 illustrates a flow chart of another method 900 performed by a storage device for improved metadata management in accordance with embodiments of the present disclosure.

FIG. 9 illustrates a flow chart of a method 900 performed by a storage device 120 for improved metadata management in accordance with an example embodiment of the present disclosure. The various operations of method 900 may be performed by the storage device 120 (particularly, using the storage controller 122 of the storage device 120).

The method 900 at block 902 comprises receiving a memory read command from the host device 110. The memory read command comprises data and a logical address associated with a data read operation initiated by the host device 110.

The method at block 904 comprises determining whether an L2P address mapping entry of a plurality of L2P address mapping entries that corresponds to the logical address is stored. The L2P address mapping entry comprises a physical address that is mapped to the logical address.

In response to determining that the L2P address mapping entry corresponding to the logical address is not stored, the method at block 906 comprises reading a first L2P address mapping table of the plurality of L2P address mapping tables. The first L2P address mapping table comprises the L2P address mapping entry corresponding to the logical address.

In response to determining that the L2P address mapping entry corresponding to the logical address is not stored, the method at block 908 comprises performing the data read operation by reading the data from the physical address of the NVM 124.

In light of the technical advancements provided by the proposed method and the system the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The above methods 800 and 900 may be described in the general context of computer-executable instructions. Generally, computer-executable instructions can include routines, programs, objects, components, data structures, procedures, modules, and functions, which perform specific functions or implement specific abstract data types.

The order in which the various operations of the methods are described is not intended to be construed as limiting, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable computing devices capable of performing the corresponding functions. The computing device may include various hardware and/or software component(s) and/or module(s) shown in FIGS. 1-7. Generally, where there are operations illustrated in Figures, those operations may have corresponding counterpart means-plus-function components.

It may be noted here that the subject matter of some or all embodiments described with reference to FIGS. 1-7 may be relevant for the methods and the same is not repeated for the sake of brevity.

In a non-limiting embodiment of the present disclosure, one or more non-transitory computer-readable media may be utilized for implementing the embodiments consistent with the present disclosure. Certain aspects may comprise a computer program product for performing the operations presented herein. For example, such a computer program product may comprise a computer-readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

We claim:

1. A method for metadata management in a storage device comprising a volatile memory, a non-volatile memory, and a buffer, the method comprising:

receiving a memory write command from a host device, wherein the memory write command comprises data and a logical address associated with a data write operation initiated by the host device;

performing the data write operation by writing the data at a physical address of the non-volatile memory that is associated with the logical address;

storing a mapping of the logical address and the physical address as a first logical-to-physical (L2P) address mapping entry of the volatile memory and as a second L2P address mapping entry of the buffer, wherein the volatile memory comprises a first set of L2P address mapping entries that includes the first L2P address mapping entry, wherein the buffer comprises a second set of L2P address mapping entries that includes the second L2P address mapping entry, and wherein the first and second sets of L2P address mapping entries are associated with a plurality of L2P address mapping tables of the non-volatile memory;

determining a number of the second set of L2P address mapping entries of the buffer exceeds a predefined number of L2P address mapping entries; and upon determining that the number of the second set of L2P address mapping entries of the buffer exceeds the predefined number of L2P address mapping entries, (i) sequentially reading a first set of L2P address mapping tables of the plurality of L2P address mapping tables of the non-volatile memory and (ii) updating the first set of L2P address mapping tables based on the first set of L2P address mapping entries of the volatile memory.

2. The method of claim 1, further comprising:

storing each of (i) the first set of L2P address mapping tables that were updated and (ii) the second set of L2P address mapping entries of the buffer into the non-volatile memory.

3. The method of claim 2, further comprising:

receiving a Normal Power Off (NPO) command from the host device; and upon receiving the NPO command from the host device, sequentially reading and updating corresponding L2P address mapping tables of the plurality of L2P address mapping tables based on the first set of L2P address mapping entries of the volatile memory.

4. The method of claim 3, wherein the sequential reading and updating of the first set of L2P address mapping tables is performed until the buffer is empty of the second set of the L2P mapping address entries.

5. The method of claim 2, further comprising:

receiving a Sudden Power Off Recovery (SPOR) command from the host device;

upon receiving the SPOR command from the host device, sequentially reading the second set of L2P address mapping entries of the buffer; and updating the volatile memory based on the second set of L2P address mapping entries of the buffer.

6. The method of claim 1, further comprising:

upon updating the first set of L2P address mapping tables, deleting the first set of L2P address mapping entries from the volatile memory.

7. The method of claim 1, wherein the volatile memory is part of a dynamic random access memory (DRAM) of the storage device, and wherein the method further comprises:

determining a size of the volatile memory based on at least one of a size of each of the plurality of L2P address mapping tables, a total number of L2P address mapping entries in each of the plurality of L2P address mapping tables, and a size of the buffer.

8. A storage device for metadata management, comprising:

a non-volatile memory;

a buffer;

a volatile memory; and at least one storage controller coupled to the non-volatile memory and the volatile memory, where the at least one storage controller is configured to:

receive a memory write command from a host device, wherein the memory write command comprises data and a logical address associated with a data write operation initiated by the host device;

perform the data write operation by writing the data at a physical address of the non-volatile memory that is associated with the logical address;

store a mapping of the logical address and the physical address as a first logical-to-physical (L2P) address mapping entry of the volatile memory and as a second L2P address mapping entry of the buffer, wherein the volatile memory comprises a first set of L2P address mapping entries that includes the first L2P address mapping entry, wherein the buffer comprises a second set of L2P address mapping entries that includes the second L2P address mapping entry, and wherein the first and second sets of L2P address mapping entries are associated a plurality of L2P address mapping tables of the non-volatile memory;

determine a number of the second set of L2P address mapping entries of the buffer exceeds a predefined number of L2P address mapping entries; and upon determining that the number of the second set of L2P address mapping entries of the buffer exceeds the predefined number of L2P address mapping entries, (i) sequentially read a first set of L2P address mapping tables of the plurality of L2P address mapping tables of the non-volatile memory and (ii) update the first set of L2P address mapping tables based on the first set of L2P address mapping entries of the volatile memory.

9. The storage device of claim 8, wherein the at least one storage controller is further configured to:

store each of (i) the first set of L2P address mapping tables that were updated and (ii) the second set of L2P address mapping entries of the buffer into the non-volatile memory.

10. The storage device of claim 9, wherein the at least one storage controller is further configured to:

receive a Normal Power Off (NPO) command from the host device; and upon receiving the NPO command from the host device, sequentially read and update corresponding L2P address mapping tables of the plurality of L2P address mapping tables based on the first set of L2P address mapping entries of the volatile memory.

11. The storage device of claim 10, wherein the sequential reading and updating of the first set of L2P address mapping tables is performed until the buffer is empty of the second set of the L2P mapping address entries.

12. The storage device of claim 9, wherein the at least one storage controller is further configured to:

receive a Sudden Power Off Recovery (SPOR) command from the host device;

upon receiving the SPOR command from the host device, sequentially read the second set of L2P address mapping entries of the buffer; and update the volatile memory based on the second set of L2P address mapping entries of the buffer.

13. The storage device of claim 8, wherein the at least one storage controller is further configured to:

upon updating the first set of L2P address mapping tables, delete the first set of L2P address mapping entries from the volatile memory.

14. The storage device of claim 8, wherein the volatile memory is a part of a dynamic random access memory (DRAM) of the storage device, and wherein the at least one storage controller is further configured to:

determine a size of the volatile memory based on at least one of a size of each of the plurality of L2P address mapping tables, a total number of L2P address mapping entries in each of the plurality of L2P address mapping tables, and a size of the buffer.

15. The storage device of claim 8, wherein the at least one storage controller is further configured to:

receive a memory read command from the host device, wherein the memory read command comprises data and a logical address associated with a data read operation initiated by the host device;

determine whether a logical-to-physical (L2P) address mapping entry of a plurality of L2P address mapping entries that corresponds to the logical address associated with the data read operation is stored in the volatile memory, wherein the L2P address mapping entry comprises a physical address that is mapped to the logical address;

in response to determining that the L2P address mapping entry corresponding to the logical address associated with the data read operation is stored in the volatile memory, perform the data read operation by reading the data from the physical address of the non-volatile memory; and in response to determining that the L2P address mapping entry corresponding to the logical address associated with the data read operation is not stored in the volatile memory:

read a first L2P address mapping table of the plurality of L2P address mapping tables, wherein the first L2P address mapping table comprises the L2P address mapping entry corresponding to the logical address associated with the data read operation; and perform the data read operation by reading the data from the physical address of the non-volatile memory.

16. The storage device of claim 9, wherein the at least one storage controller is configured to terminate the write operation upon determining that the number of the second set of L2P address mapping entries of the buffer does not exceed the predefined number of L2P address mapping entries.

17. A method for metadata management in a storage device comprising a volatile memory, a non-volatile memory, and a buffer, the method comprising:

receiving a memory read command from a host device, wherein the memory read command comprises data and a logical address associated with a data read operation initiated by the host device;

determining that a logical-to-physical (L2P) address mapping entry of a plurality of L2P address mapping entries that corresponds to the logical address is not stored in the buffer, wherein the L2P address mapping entry comprises a physical address that is mapped to the logical address; and in response to determining that the L2P address mapping entry corresponding to the logical address is not stored in the buffer:

determining that the L2P address mapping entry corresponding to the logical address is not stored in an L2P cache different from the buffer; and in response to determining that the L2P address mapping entry corresponding to the logical address is not stored in the L2P cache:

reading a first L2P address mapping table of a plurality of L2P address mapping tables, wherein the first L2P address mapping table comprises the L2P address mapping entry corresponding to the logical address; and performing the data read operation by reading the data from the physical address of the non-volatile memory and using the first L2P address mapping table of the plurality of L2P address mapping tables.

* * * * *